(12) United States Patent
Baughman et al.

(10) Patent No.: US 11,093,835 B2
(45) Date of Patent: *Aug. 17, 2021

(54) NATURAL LANGUAGE QUESTION EXPANSION AND EXTRACTION

(71) Applicant: International Business Machines Corporation, Armonk, NY (US)

(72) Inventors: Aaron K. Baughman, Silver Spring, MD (US); Linda M. Boyer, Ossining, NY (US); Wesley T. Chuang, Vienna, VA (US); Meilan Ding, Mclean, VA (US); William R. Gee, Ashburn, VA (US); Palani Sakthi, Palatine, IL (US)

(73) Assignee: International Business Machines Corporation, Armonk, NY (US)

( * ) Notice: Subject to any disclaimer, the term of this patent is extended or adjusted under 35 U.S.C. 154(b) by 1186 days.

This patent is subject to a terminal disclaimer.

(21) Appl. No.: 15/358,381

(22) Filed: Nov. 22, 2016

(65) Prior Publication Data

US 2017/0076204 A1 Mar. 16, 2017

Related U.S. Application Data

(63) Continuation of application No. 13/760,639, filed on Feb. 6, 2013, now Pat. No. 9,535,898.

(51) Int. Cl.
*G06N 5/02* (2006.01)
*G06F 40/205* (2020.01)
(Continued)

(52) U.S. Cl.
CPC ............. *G06N 5/02* (2013.01); *G06F 40/205* (2020.01); *G06F 40/279* (2020.01); *G06F 40/295* (2020.01)

(58) Field of Classification Search
CPC ....... G06N 5/02; G06F 40/279; G06F 40/205; G06F 40/295
See application file for complete search history.

(56) References Cited

U.S. PATENT DOCUMENTS 6,959,417 B2  10/2005  Gupta
7,318,191 B2   1/2008  Kunzel
(Continued)

OTHER PUBLICATIONS

Agichtein, Eugene, Steve Lawrence, and Luis Gravano. "Learning search engine specific query transformations for question answering." Proceedings of the 10th international conference on World Wide Web. 2001. (Year: 2001).*
(Continued)

*Primary Examiner* — Eric Nilsson
(74) *Attorney, Agent, or Firm* — Erika R. DeCosty; Aaron N. Pontikos

(57) ABSTRACT

Methods, computer program products and systems for generating at least one factual question from a set of seed questions and answer pairs. One method includes: obtaining at least one seed question and answer pair from the set of seed question and answer pairs; extracting a set of features associated with the at least one seed question and answer pair using at least one common analysis system (CAS) in a set of CASs and a specific knowledge base; generating a set of candidate questions from the extracted set of features using a logistic regression algorithm and the specific knowledge base; and ranking each candidate question relative to a remainder of candidate questions in the set of candidate questions based on the extracted set of features and the at least one seed question and answer pair.

20 Claims, 9 Drawing Sheets

(51) Int. Cl.
    G06F 40/279    (2020.01)
    G06F 40/295    (2020.01)

(56) References Cited

U.S. PATENT DOCUMENTS

| | | | |
|---|---|---|---|
| 7,519,529 | B1 | 4/2009 | Horvitz |
| 7,809,664 | B2 | 10/2010 | Heck |
| 9,535,898 | B2 | 1/2017 | Baughman |
| 2002/0170114 | A1 | 11/2002 | Wolcott |
| 2004/0073866 | A1 | 4/2004 | Kunzel |
| 2006/0172276 | A1* | 8/2006 | Higgins .................. G09B 7/02 434/362 |
| 2008/0213020 | A1 | 9/2008 | Kunzel |
| 2009/0162824 | A1 | 6/2009 | Heck |
| 2009/0287678 | A1* | 11/2009 | Brown .................. G06F 16/334 |
| 2014/0379330 | A1 | 12/2014 | Baughman |

OTHER PUBLICATIONS

Heilman, Michael. Automatic factual question generation from text. Diss. Ph. D. thesis, Carnegie Mellon University, 2011. (Year: 2011).*

Day, Min-Yuh, Chorng-Shyong Ong, and Wen-Lian Hsu. "Question classification in english-chinese cross-language question answering: an integrated genetic algorithm and machine learning approach." 2007 IEEE International Conference on Information Reuse and Integration. IEEE, 2007. (Year: 2007).*

Liu, Ying-Hsang, and Nicholas J. Belkin. "Query reformulation, search performance, and term suggestion devices in question-answering tasks." Proceedings of the second international symposium on Information interaction in context. 2008. (Year: 2008).*

Radev, Dragomir R., et al. "Mining the web for answers to natural language questions." Proceedings of the tenth international conference on Information and knowledge management. 2001. (Year: 2001).*

Curto et al., "Exploring linguistically-rich patterns for question generation", Proceedings of the UCNLG+Eval: Language Generation and Evaluation Workshop, pp. 33-38, Edinburgh, Scotland, UK, Jul. 31, 2011.

Agarwal et al., "Automatic Gap-till Question Generation from Text Books", Proceedings of the Sixth Workshop on Innovative Use of NLP for Building Educational Applications, pp. 56-64, Portland, Oregon, Jun. 24, 2011.

Agarwal et al, "Automatic Question Generation using Discourse Cues", Proceedings of the Sixth Workshop on Innovative Use of NLP for Building Educational Applications, pp. 1-9, Portland, Oregon, Jun. 24, 2011.

Nandhini et al., "Math Word Question Generation for Training the Students with Learning Difficulties", International conference and Workshop on Emerging Trends in Technology, Feb. 25-26, 2011, Mumbai, India.

Heilman, Michael, "Automatic Factual Question Generation from Text", 2011, Michael Heilman.

Heilman et al., "Good Question! Statistical Ranking for Question Generation", Human Language Technologies: The 2010 Annual Conference of the North American Chapter of the ACL, pp. 609-617, Los Angeles, California, Jun. 2010.

Afzal et al, "Unsupervised Relation Extraction for Automatic Generation of Multiple-Choice Questions", International Conference RANLP 2009, Borovets, Bulgaria pp. 1-5.

Hoshino et al., "WebExperimenter for multiple-choice question generation", Proceedings of HLT/EMNLP 2005 Demonstration Abstracts, pp. 18-19, Vancouver, Oct. 2005.

Liu et al, "Question Taxonomy and Implications for Automatic Question Generation" University of Sydney, Syndney, Australia, 2006.

Chang et al., "AGQ: A Model of Student Question Generation Supported by One-on-One Educational Computing".

Rus et al, "The First Question Generation Shared Task Evaluation Challenge", The University of Memphis, Memphis Tennessee, 2010.

U.S. Appl. No. 13/760,639, filed Feb. 6, 2013, Final Office Action dated Jul. 16, 2015, 30 pages.

Final Office Action for U.S. Appl. No. 14/483,693, dated Jul. 16, 2015, 35 pages.

Office Action for U.S. Appl. No. 14/483,693, dated Feb. 13, 2015, 33 pages.

Office Action for U.S. Appl. No. 13/760,639, dated Jan. 16, 2015, 28 pages.

Final Office Action for U.S. Appl. No. 13/760,639, dated Jul. 16, 2015, 30 pages.

Notice of Allowance for U.S. Appl. No. 13/760,639, dated Sep. 1, 2016, 13 pages.

Al-Yahya, Maha et al., "OntoQue: A Question Generation Engine for Educational Assesment Based on Domain", 2011 11th IEEE International Conference on Advanced Learning Technologies, DOI 10.1109/ICALT.2011.124, pp. 393-395.

Chang et al., "A Learning Strategy of Student Question Generation to Enhance Comprehension of Learning Materials in Digital Classroom Environment", Proceedings of the Fifth IEEE International Conference on Advanced Learning Technologies (ICALT'05), 3 pages.

Ginsburg, Jason, "A Computational Model of Language Generation Applied to English Wh-questions", 2010 10th International Conference on Intelligent Systems Design and Applications, 978-1-4244-8136-1/10/, Copyright 2010 IEEE, pp. 1077-1082.

Hall et al., "Question Database Management and Program for Generation of Examinations in National Board of Medical Examiner Format", 0195-42I0/83/ 0000/0454 @ 1983 IEEE, pp. 454-456.

Kim et al., "Design of Question Answering System with Automated Question Generation", Fourth International Conference on Networked Computing and Advanced Information Management, 978-0-7695-3322-3/08 © 2008 IEEE, DOI 10.1109/NCM.2008.236, pp. 365-368.

Maggio et al, "Outstanding Questions around Increasing Variable Generation Penetration in the ERCOT System", 978-1-4244-6551-4/10/ ©2010 IEEE, 3 pages.

McGough et al., "A web-based testing system with dynamic question generation", Session S3C, 31st ASEEAEEE Frontiers in Education Conference, Oct. 10-13, 2001 Reno, NV, 6 pages.

Myller, Niko, "Automatic Generation of Prediction Questions during Program Visualization", Electronic Notes in Theoretical Computer Science (ENTCS) • Jul. 2007 • https://doi.org/10.1016/j.entcs.2007.01.034, 4 pages.

Rozali et al., "A Survey on Adaptive Qualitative Assessment and Dynamic Questions Generation Approaches", 378-1-4244-6716-7/10/ © 2010 IEEE. pp. 1479-1484.

Sarantinos et al., "Question Analysis and Explanation Generation", 0073-1129/91/0000/0051 Copyright 1991 IEEE, pp. 51-59.

Stanescu, Liana et al., "Question generation for learning evaluation", Proceedings of the International Multiconference on Computer Science and Information Technology, pp. 509-513, 978-83-60810-14-9/08, Copyright 2008 IEEE.

Yu, Fu-Yun, Promoting Metacognitive Strategy Development through Online Question-Generation Instructional Approach, Proceedings of the 2005 conference on Towards Sustainable and Scalable Educational, Innovations Informed by the Learning Sciences: Sharing Good Practices of Research, Experimentation and Innovation • May 2005 pp. 564-571, Abstract 4 pages.

* cited by examiner

NATURAL LANGUAGE QUESTION EXPANSION AND EXTRACTION

BACKGROUND

Aspects of the invention relate generally to information systems. More particularly, various aspects of the invention relate to decision making in information systems.

Conventional decision engines in information systems are cumbersome and ineffective. Generally speaking, these decision engines frequently do not allow a user (e.g., a human user) to ask questions which elicit a desired response. Even when these engines do allow a user to ask such questions, these engines do not utilize trainable question models. As such, these conventional decision models are ineffective and can require repetition of tasks to achieve results.

BRIEF SUMMARY

Methods, computer program products and systems for generating at least one candidate question from a set of seed questions are disclosed. In some embodiments, a computer-implemented method for generating at least one candidate question from a set of seed questions and answer pairs is disclosed. The method can include: obtaining at least one seed question and answer pair from the set of seed question and answer pairs; extracting a set of features associated with the at least one seed question and answer pair using at least one common analysis system (CAS) in a set of CASs and a specific knowledge base; generating a set of candidate questions from the extracted set of features using a logistic regression algorithm and the specific knowledge base, wherein each candidate question includes an expansion of each of the extracted set of features; and ranking each candidate question relative to a remainder of candidate questions in the set of candidate questions based on the extracted set of features and the at least one seed question and answer pair Some particular embodiments include a computer-implemented method for generating at least one candidate question from a set of seed questions and answer pairs is disclosed. The method can include: obtaining at least one seed question and answer pair from the set of seed question and answer pairs; extracting a set of features associated with the at least one seed question and answer pair using at least one common analysis system (CAS) in a set of CASs and a specific knowledge base; generating a set of candidate questions from the extracted set of features using a logistic regression algorithm and the specific knowledge base, wherein each candidate question includes an expansion of each of the extracted set of features; and ranking each candidate question relative to a remainder of candidate questions in the set of candidate questions based on the extracted set of features and the at least one seed question and answer pair Various additional particular embodiments include a computer program product having program code, which when executed on at least one computing device, causes the at least one computing device to generate at least one candidate question from a set of seed questions and answer pairs by performing actions including: obtaining at least one seed question and answer pair from the set of seed question and answer pairs; extracting a set of features associated with the at least one seed question and answer pair using at least one common analysis system (CAS) in a set of CASs and a specific knowledge base; generating a set of candidate questions from the extracted set of features using a logistic regression algorithm and the specific knowledge base, wherein each candidate question includes an expansion of each of the extracted set of features; and ranking each candidate question relative to a remainder of candidate questions in the set of candidate questions based on the extracted set of features and the at least one seed question and answer pair Various additional particular embodiments include a system having: at least one computing device configured to generate at least one candidate question from a set of seed questions and answer pairs by performing actions including: obtaining at least one seed question and answer pair from the set of seed question and answer pairs; extracting a set of features associated with the at least one seed question and answer pair using at least one common analysis system (CAS) in a set of CASs and a specific knowledge base; generating a set of candidate questions from the extracted set of features using a logistic regression algorithm and the specific knowledge base, wherein each candidate question includes an expansion of each of the extracted set of features; and ranking each candidate question relative to a remainder of candidate questions in the set of candidate questions based on the extracted set of features and the at least one seed question and answer pair.

Various additional particular embodiments include methods, computer program products and systems for generating at least one factual question from a set of seed questions and answer pairs. One method includes: obtaining at least one seed question and answer pair from the set of seed question and answer pairs; extracting a set of features associated with the at least one seed question and answer pair using at least one common analysis system (CAS) in a set of CASs and a specific knowledge base; generating a set of candidate questions from the extracted set of features using a logistic regression algorithm and the specific knowledge base; and ranking each candidate question relative to a remainder of candidate questions in the set of candidate questions based on the extracted set of features and the at least one seed question and answer pair.

Another aspect includes a computer program product having program code, which when executed on at least one computing device, causes the at least one computing device to generate at least one candidate question from a set of seed questions and answer pairs by performing actions including: obtaining at least one seed question and answer pair from the set of seed question and answer pairs; extracting a set of features associated with the at least one seed question and answer pair using at least one common analysis system (CAS) in a set of CASs and a specific knowledge base; generating a set of candidate questions from the extracted set of features using a logistic regression algorithm and the specific knowledge base; and ranking each candidate question relative to a remainder of candidate questions in the set of candidate questions based on the extracted set of features and the at least one seed question and answer pair.

Additional aspects include a system having: at least one computing device configured to generate at least one candidate question from a set of seed questions and answer pairs by performing actions including: obtaining at least one seed question and answer pair from the set of seed question and answer pairs; extracting a set of features associated with the at least one seed question and answer pair using at least one common analysis system (CAS) in a set of CASs and a specific knowledge base; generating a set of candidate questions from the extracted set of features using a logistic regression algorithm and the specific knowledge base; and ranking each candidate question relative to a remainder of candidate questions in the set of candidate questions based on the extracted set of features and the at least one seed question and answer pair.

Figure 1:
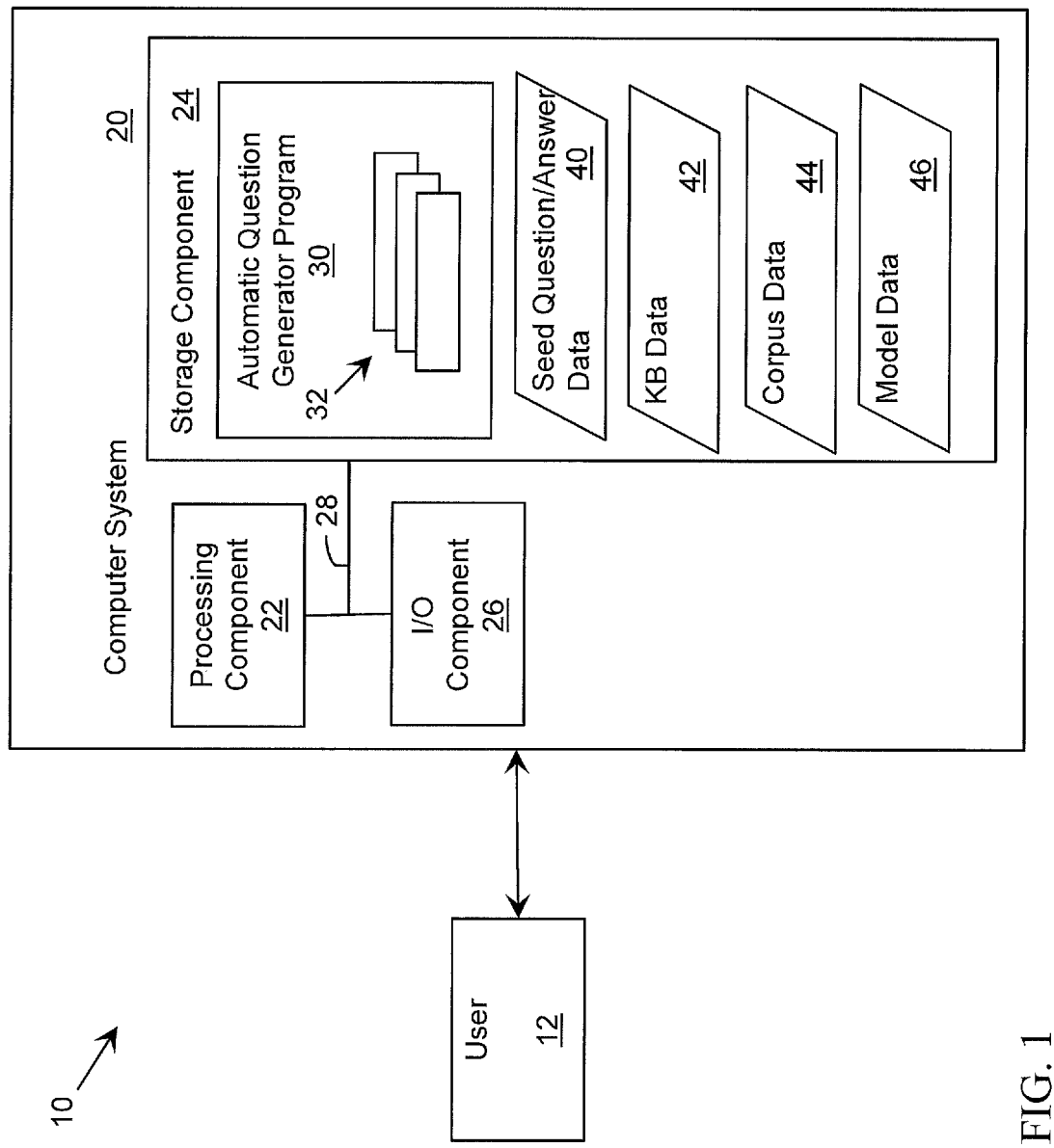
FIG. 1 shows a schematic depiction of a computing environment for providing an automatic question generator according to various embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

This invention relates generally to information systems. More particularly, various aspects of the invention relate to decision making in information systems.

As noted herein, conventional decision engines in information systems are cumbersome and ineffective. Generally speaking, these decision engines frequently do not allow a user (e.g., a human user) to ask questions which elicit a desired response. Even when these engines do allow a user to ask such questions, these engines do not utilize trainable question models. As such, these conventional decision models are ineffective and can require repetition of tasks to achieve results.

Embodiments of the present invention are directed to an automatic question generator tool based on a natural language question expansion and labeling procedure. The tool described herein uses a generic algorithm to propose a seed question set by passing it through an analytic pipeline for feature extraction. The obtained results are queried through specific knowledge bases according to their feature sets to generate expanded candidate questions. The features are stored within the candidate questions and used as inputs into a logistic regression model to produce a ranked list of candidate questions and their confidence values.

Accordingly, aspects of the invention disclosed herein provide a tool for automatically discovering questions for an information system, and at the same time, systematically evaluating the questions by qualified models so that only those questions that pass a logical analysis (or simply, make sense) remain. In so doing, the semantics of data from both angles—questions and answers—and their most interesting paths are better exercised and annotated. Subsequently, a developer (e.g., an information system developer) can more easily test the system with automatically generated useful questions. An end user will know beforehand what questions to expect before being submerged by an immense amount of data.

Some particular embodiments include a computer-implemented method for generating at least one factual question from a set of seed questions and answer pairs. The method can include: obtaining at least one seed question and answer pair from the set of seed question and answer pairs; extracting a set of features associated with the at least one seed question and answer pair using at least one common analysis system (CAS) in a set of CASs and a specific knowledge base; generating a set of candidate questions from the extracted set of features using a logistic regression algorithm and the specific knowledge base, wherein each candidate question includes an expansion of each of the extracted set of features; and ranking each candidate question relative to a remainder of candidate questions in the set of candidate questions based on the extracted set of features and the at least one seed question and answer pair Various additional particular embodiments include a computer program product having program code, which when executed on at least one computing device, causes the at least one computing device to generate at least one factual question from a set of seed questions and answer pairs by performing actions including: obtaining at least one seed question and answer pair from the set of seed question and answer pairs; extracting a set of features associated with the at least one seed question and answer pair using at least one common analysis system (CAS) in a set of CASs and a specific knowledge base; generating a set of candidate questions from the extracted set of features using a logistic regression algorithm and the specific knowledge base, wherein each candidate question includes an expansion of each of the extracted set of features; and ranking each candidate question relative to a remainder of candidate questions in the set of candidate questions based on the extracted set of features and the at least one seed question and answer pair Various additional particular embodiments include a system having: at least one computing device configured to generate at least one factual question from a set of seed questions and answer pairs by performing actions including: obtaining at least one seed question and answer pair from the set of seed question and answer pairs; extracting a set of features associated with the at least one seed question and answer pair using at least one common analysis system (CAS) in a set of CASs and a specific knowledge base; generating a set of candidate questions from the extracted set of features using a logistic regression algorithm and the specific knowledge base, wherein each candidate question includes an expansion of each of the extracted set of features; and ranking each candidate question relative to a remainder of candidate questions in the set of candidate questions based on the extracted set of features and the at least one seed question and answer pair Turning to the drawings, FIG. 1 shows an illustrative environment 10 for performing automatic question generation functions according to an embodiment of the invention. To this extent, environment 10 includes a computer system 20 that can perform a process described herein in order to provide an automatic question generator system. In particular, computer system 20 is shown including an automatic question generator program 30, which makes computer system 20 operable to provide an automatic question generator tool by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as automatic question generator program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable a system user 12 to communicate with computer system 20 using any type of communications link. To this extent, automatic question generator program 30 can manage a set of interfaces (e.g., graphical user interface(s), application program interface, and/or the like) that enable human and/or system users 12 to interact with automatic question generator program 30. Further, automatic question generator program 30 can manage (e.g., store, retrieve, create, manipulate, organize, present, etc.) the data, such as seed question/answer data 40, knowledge base (KB) data 42, corpus data 44 and/or model data 46, using any solution.

In any event, computer system 20 (including automatic question generator program 30) can obtain seed question/answer data 40, knowledge base (KB) data 42, corpus data 44 and/or model data 46, using any solution. For example, computer system 20 can generate and/or be used to seed question/answer data 40, knowledge base (KB) data 42, corpus data 44 and/or model data 46, retrieve seed question/answer data 40, knowledge base (KB) data 42, corpus data 44 and/or model data 46 from one or more data stores, receive seed question/answer data 40, knowledge base (KB) data 42, corpus data 44 and/or model data 46 from another system, and/or the like.

Computer system 20 can comprise one or more general purpose computing articles of manufacture (e.g., computing devices) capable of executing program code, such as automatic question generator program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, automatic question generator program 30 can be embodied as any combination of system software and/or application software.

Further, automatic question generator program 30 can be implemented using a set of modules 32. In this case, a module 32 can enable computer system 20 to perform a set of tasks used by automatic question generator program 30, and can be separately developed and/or implemented apart from other portions of automatic question generator program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of automatic question generator program 30 fixed thereon (e.g., one or more modules 32). However, it is understood that computer system 20 and automatic question generator program 30 are only representative of various possible equivalent computer systems that may perform a process described herein. To this extent, in other embodiments, the functionality provided by computer system 20 and automatic question generator program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

Figure 2:
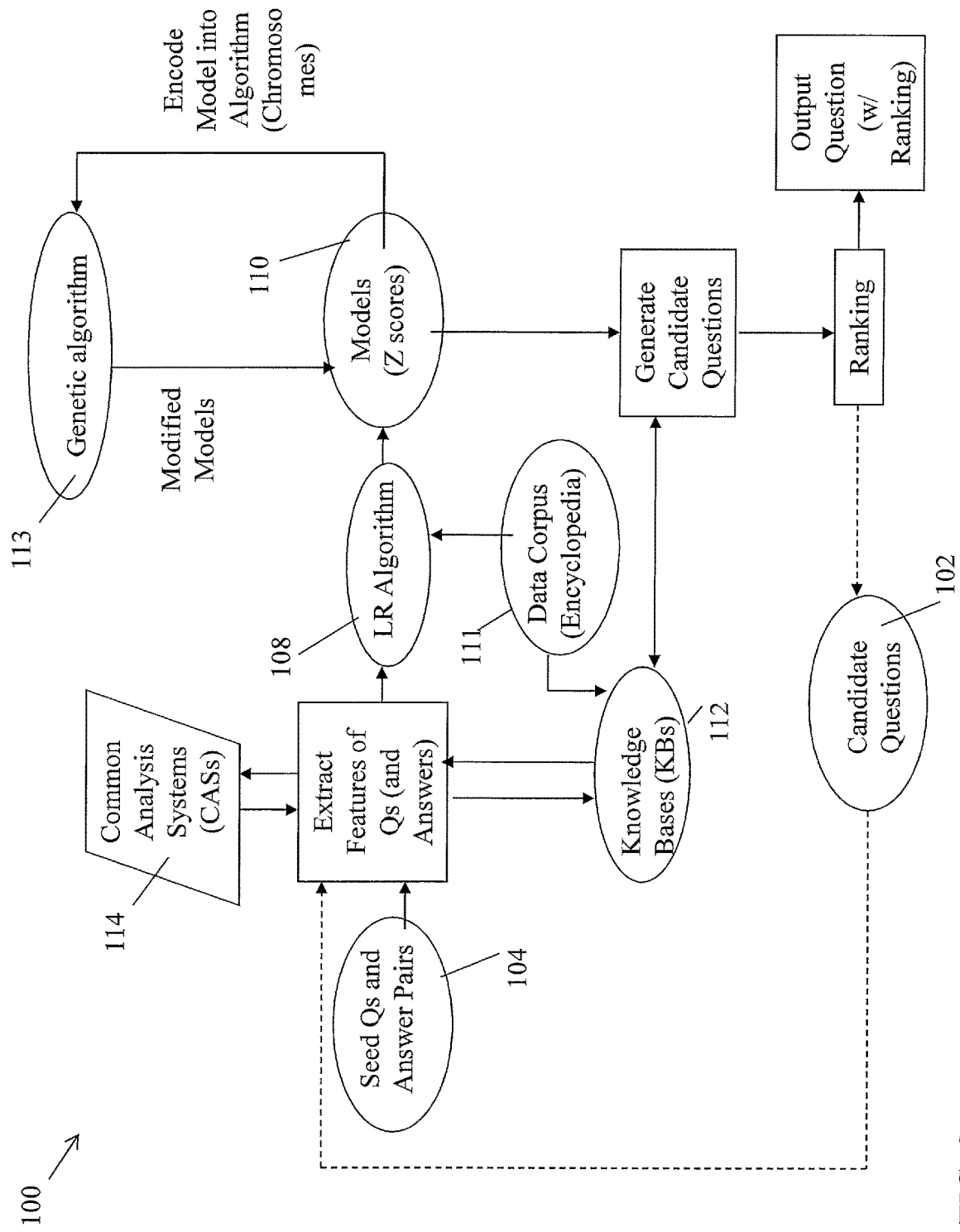
FIGS. 2-7 show schematic depictions of data-process flows according to various embodiments.

As discussed herein, the automatic question generator program 30 enables computer system 20 to automatically generate questions according to the various embodiments of the invention. Turning to FIG. 2, a schematic data flow diagram 100 illustrating functions performed by the automatic question generator program 30 is shown according to various embodiments of the invention. The automatic question generator program 30 is heuristic, in that it generates one or more candidate questions 102 from a set of seed question and answer pairs (seed Qs and answer pairs) 104. The seed question and answer pairs 104 can include sets of questions and their paired answers. The seed question and answer pairs 104 can be manually entered into the computer system 20 (e.g., via the automatic question generator program 30), e.g., via user 12. In some cases, the one or more candidate questions 102 can be generated by following a multi-process approach.

In a first process, a seed question and paired answer (in a set of seed questions and answer pairs) 104 is obtained, e.g., via entry by one or more user(s) 12. In a second process, a set of features of the seed question and answer pair is extracted from the seed question and answer pair 104. In some cases, the set of features can be extracted form the seed question and answer pair 104 using a specific knowledge base (KB) 112 and one or more common analysis systems (CASs) 114. The process of extracting features using the CAS and KB is further described with respect to FIGS. 3-4.

After extracting the features of the seed question and answer pairs 104, in particular embodiments, the automatic question generator program 30 utilizes an algorithm (e.g., a logistic regression (LR) algorithm 108) to convert each seed question and answer pair 104 (including the extracted features) into at least one model 110. The model(s) 110 can include semantic connections between each seed question and answer (in each pair 104). As shown the model(s) 110 can be iteratively modified using the genetic algorithm 113 (in an additional process loop) to make additional semantic connections between each seed question and answer 104. In forming these semantic connections between the seed question and answer pairs 104, the logistic regression (LR) algorithm 110 utilizes the seed question, the associated answer (including extracted features), and a corpus of data 111 (e.g., an encyclopedia). The corpus of data 111 can include information such as definitions of terms, antonyms, synonyms, and relationships between words and terms such as whether a first term is included in a definition or encyclopedia entry for another term. In one sense, the automatic question generator program 30 acts as a "student" which reads an encyclopedia (corpus of data 111) to develop knowledge about terms and definitions, and then reinforces and builds/reinforces that knowledge by reading practice questions and answer pairs (seed question and answer pairs 104). The associations made by the automatic question generator program 30 are then recorded as useful models 110. As described herein, the automatic question generator program 30 can develop model(s) 110 to answer new questions, and ultimately "teach" new models 110.

In some cases, developing of the models 110 includes using the logistic regression algorithm 108 to extract a sentence or a set of sentences from the text of the seed question and answer pair 104, and transform that sentence or set of sentences into a simpler declarative statement through summarization techniques or transforming lexical items, syntactic structure, and/or semantics. As noted, further detail regarding extraction of the set of features and transforming the features into simpler declarative statements is discussed with respect to FIG. 3. The extracted features can also be scored according to one or more criteria and stored in one or more of the models 110, as described further herein. The models 110 can be applied to the extracted set of features to determine a z-score for each feature in the set of features, giving relative values to those features with respect to the remainder of features in the set. As is known in the art, a z-score can indicate how many deviations a particular data item is separated from (either above or below) a mean. Z-scores can be derived according to conventional measures, e.g., by subtracting the population mean from an individual raw score to get a difference (delta), and then dividing the difference (delta) by the population standard deviation.

After extracting features and applying a z-score to those features, a list of candidate questions 102 can be generated based on the models 110 (and extracted sets of features) formed by the LR algorithm 108 (and refined/modified by the genetic algorithm 113) and the specific knowledge base 112. The list of candidate questions 102 can be generated by querying the KB 112 (such as a specific knowledge base) using the extracted set of features and the models 110. As noted, the models 110 can include scores for the extracted features, where those scores include probability and/or number values associated with other features/terms that may appear in a sentence, question or other phrase. In some cases, each candidate question 102 is generated based upon the score of one or more extracted features. For example, a model 110 can identify a term as an object, subject, modifier, etc. and score that term in terms of its relationship with other terms (adjectives, nouns, etc.). Additionally, the model 110 can associate terms (and their scores) with "types" of questions, e.g., questions that as "what", "when", "where", "why", etc.

In one example, a sentence can be transformed into a set of questions (e.g., candidate question 102) by executing syntactic transformations on each feature. For example, a sentence found from searching the knowledge base 112 (and corpus of data 111) is converted into a candidate question 102 that is declarative, imperative, exclamatory, etc. The question can then be scored and ranked. In other cases, the automatic question generator program 30 can perform WH-movement, subject-auxiliary inversion, gap identification and filler placement. In some cases, the candidate question 102 can be manually (e.g., by a human user) linked with a factual answer, and in some cases (shown in phantom), that candidate question 102 and factual answer can be relayed back to the extraction process just as seed question and answer pairs 104 for feature extraction and further development/refinement of models 110. In some cases, this could include re-ranking of the set of candidate questions by repeating the processes performed for the seed questions and answers 104.

As shown in FIG. 2, after generating each candidate question 102, that candidate question is ranked based upon the set of extracted features (e.g., the z-scores), and the seed question/answer pair 104. In other words, the candidate questions 102 are each scored and ranked according to features of the source sentences, input sentences, question, and transformations used in generation. In one example, a sentence from corpus data 111 could read, "The Eastern Seaboard braced Tuesday for the full impact of Hurricane Ivan. It barreled toward shore packing 100-mph winds and a 15-foot storm surge that forecasters called life-threatening." According to various embodiments of the invention, the word "It" which begins the second sentence would need to be resolve (anaphora-resolved) to "Hurricane Ivan", not to "Eastern Seaboard" or "Monday", in order to answer a question relating to this sentence. An example question could read: "Which storm was life-threatening?"

Further description of particular embodiments of the invention follows.

Regarding the formation of models 110, the traditional Bayes Theorem applies to various embodiments of the model formation. A model, m, is selected from all models, M. The maximum likelihood algorithm maximizes $P(I_d|M, H_p)$ were the prior probability is defined by a set of models and a halting criterion: $H_p$.

$$P(M_d = m \mid I_d, H_p) = \frac{P(I_d \mid M_p)P(M, H_p)}{\sum_M P(I_d \mid M_i, H_p)P(M, H_p)} \quad \text{(Equation 1)}$$

The maximum likelihood algorithm can be encoded into the genetic algorithm 113, where the models 110 include banks of logistic regression algorithms. Each bank can include a plurality of models 110 to route types of data to the appropriate logistic regressor.

Figure 3:
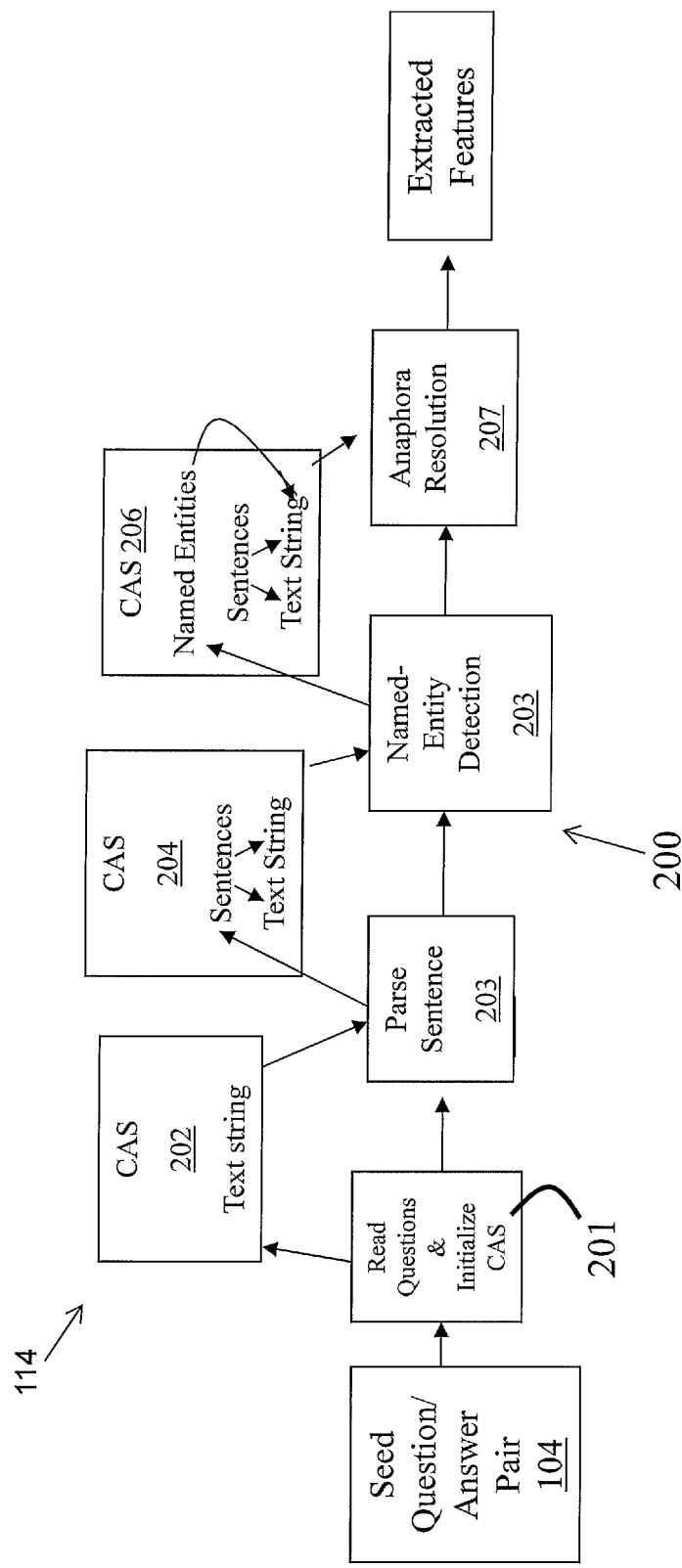

As shown in the process flow of FIG. 3, an initial question set (seed question) 104 is created to seed the system with topics of interest. Each seed question and answer pair 104 is passed through an analytic pipeline 200 for feature extraction (set of features). As shown, the analytical pipeline 200 can perform a plurality of processes to transform/parse the seed question and answer pair 104 and extract features. For example, in a first sub-process 201, the seed question and answer pair 104 is read and passed through a first CAS (common analysis system) 202 in the set of CASs 114. The first CAS 202 can identify and isolate a text string in the seed question and answer pair 104. Next, in sub-process 203, the text string is parsed into sentences (using second CAS 204 in the set of CASs 114). After parsing the text string into sentences, in sub-process 205, a third CAS 206 in the set of CASs 114 can detect named entities (e.g., recognizable nouns) within the text string (and parsed sentences). Finally, in sub-process 207, the named entities, sentences and text string are filtered using an anaphora resolution to extract features.

The models 110 are internal representations used by the automatic question generator program 30 to represent the after-parse natural language strings. Such (graph-like) structure is capable of rendering the syntactic and semantic aspects of the sentences, and at the same time, allow the system to duplicate, transform, annotate (attach) more meaning to the data structure representing that sentence. The structure can be easily converted into a (tabular) format, which the machine learning (genetic) algorithm 113 takes as input. In various embodiments, the automatic question generator program 30 can reverse the process, e.g., by taking syntactic, semantic information and converting it back the natural language text.

Figure 4:
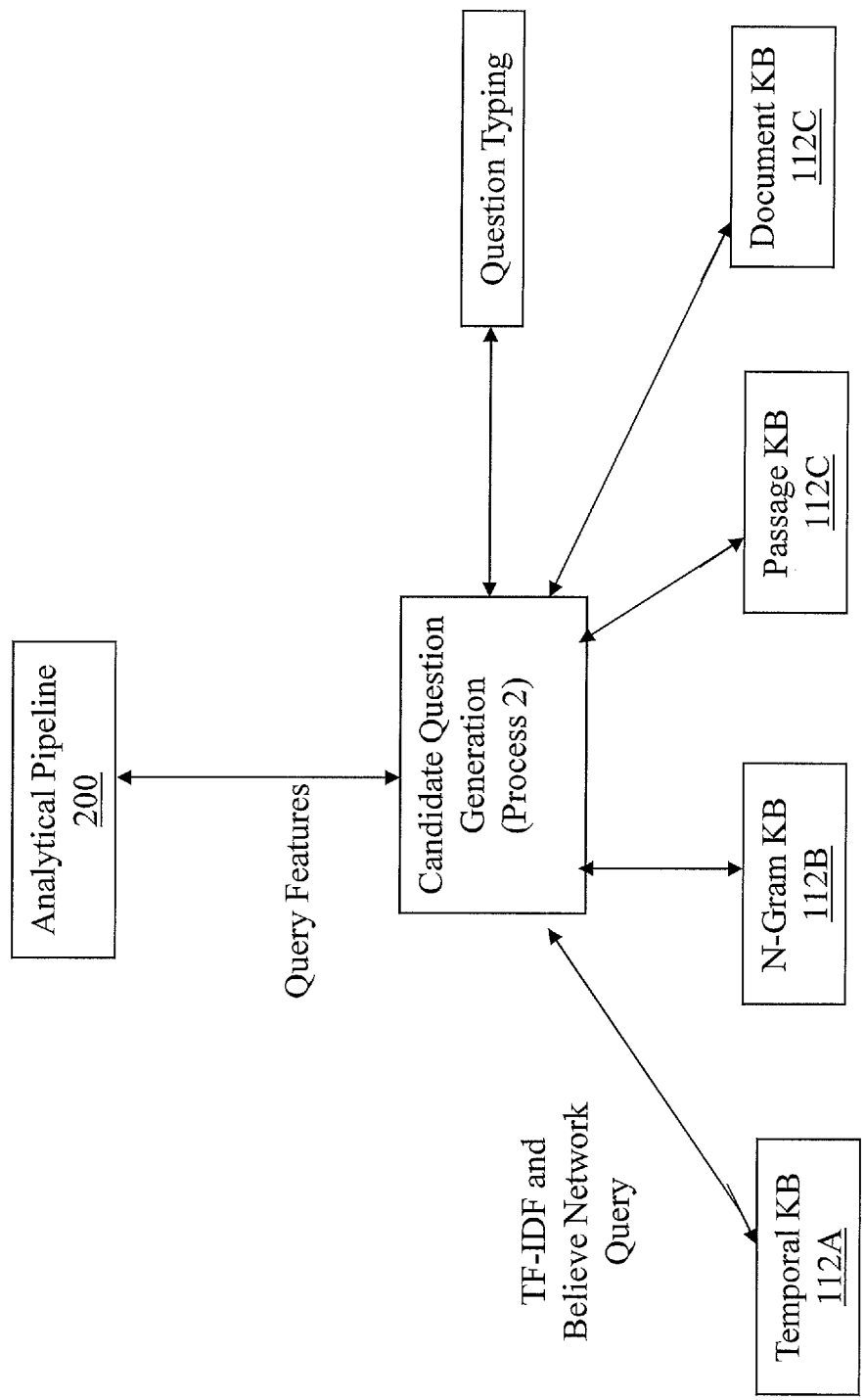

The extracted feature set associated with a given seed question and answer pair 104 is used to query a specific knowledge base (e.g., one or more KB 112) for question expansion, as discussed herein. The question expansion is evidenced by question type (lexical question type). Each of the expanded portions from the seed question and answer pair 104 becomes a candidate question 102. FIG. 4 further depicts the logical flow for generation of candidate questions 102.

For example, the term frequency—inverse document frequency for lucene—or a belief network query for indri, can be issued to knowledge bases. A temporal knowledge base (KB 112A) can provide chronological and relative disambiguation. Additional knowledge bases 112 such as a passage KB 112C for context retrieval, and a document KB 112D for title retrieval include additional information for the generation of candidate questions 102. The question type provides the type checking of the question that belongs to specific optional category or domain. Any number of KBs 112 (e.g., 112A, 112B, 112C, 112D, etc.) which are distributed or centralized can be utilized according to the various embodiments of the invention.

As described herein, in various embodiments, each of the candidate questions 102 is passed through an analytic pipeline 200 for extracting features. The features can be stored within a common analytic structure and attached to the candidate question 102. In various embodiments, the feature set can be used as an input into a logistic regression model (or, log it) 110. As shown in Equation 1, the set of models M, provides confidence values about whether a candidate question is syntactically and semantically correct. A model $m_1$, produces a ranked list of candidate questions 102 and confidence values associated with each of the candidate question 102. All of the other models, [ . . . , $m_{i-1}$, $m_{i+1}$ . . . ], jointly produce ranked candidate questions 102 and associated confidence values. The confidence values are within the interval [1,0].

Figure 5:
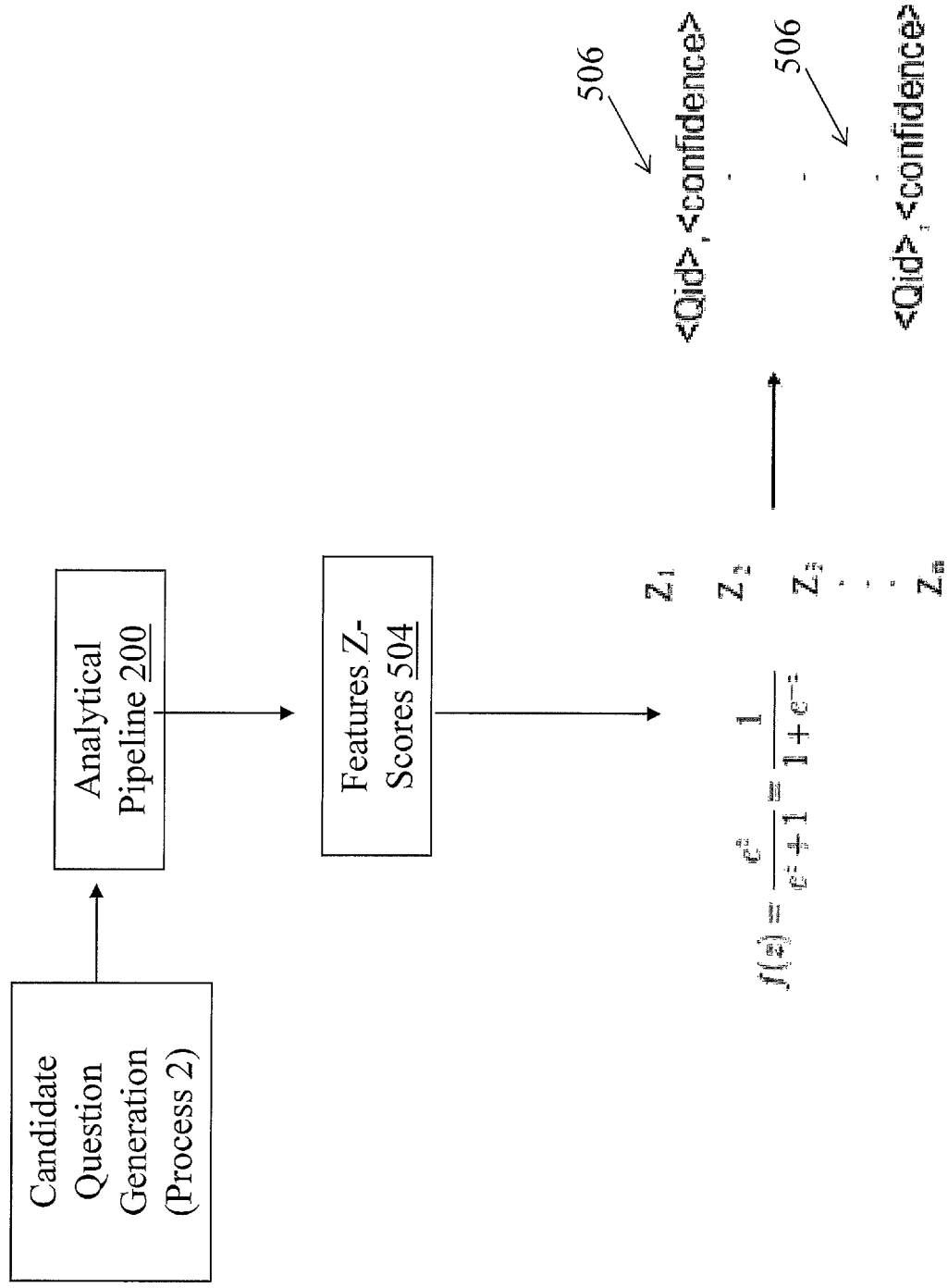

FIG. 5 illustrates an example process flow for extracting a z-score from the feature set, where Z scores 504 are generated for each of the features in feature set, and each Z score 504 is given a confidence value 506.

Figure 6:
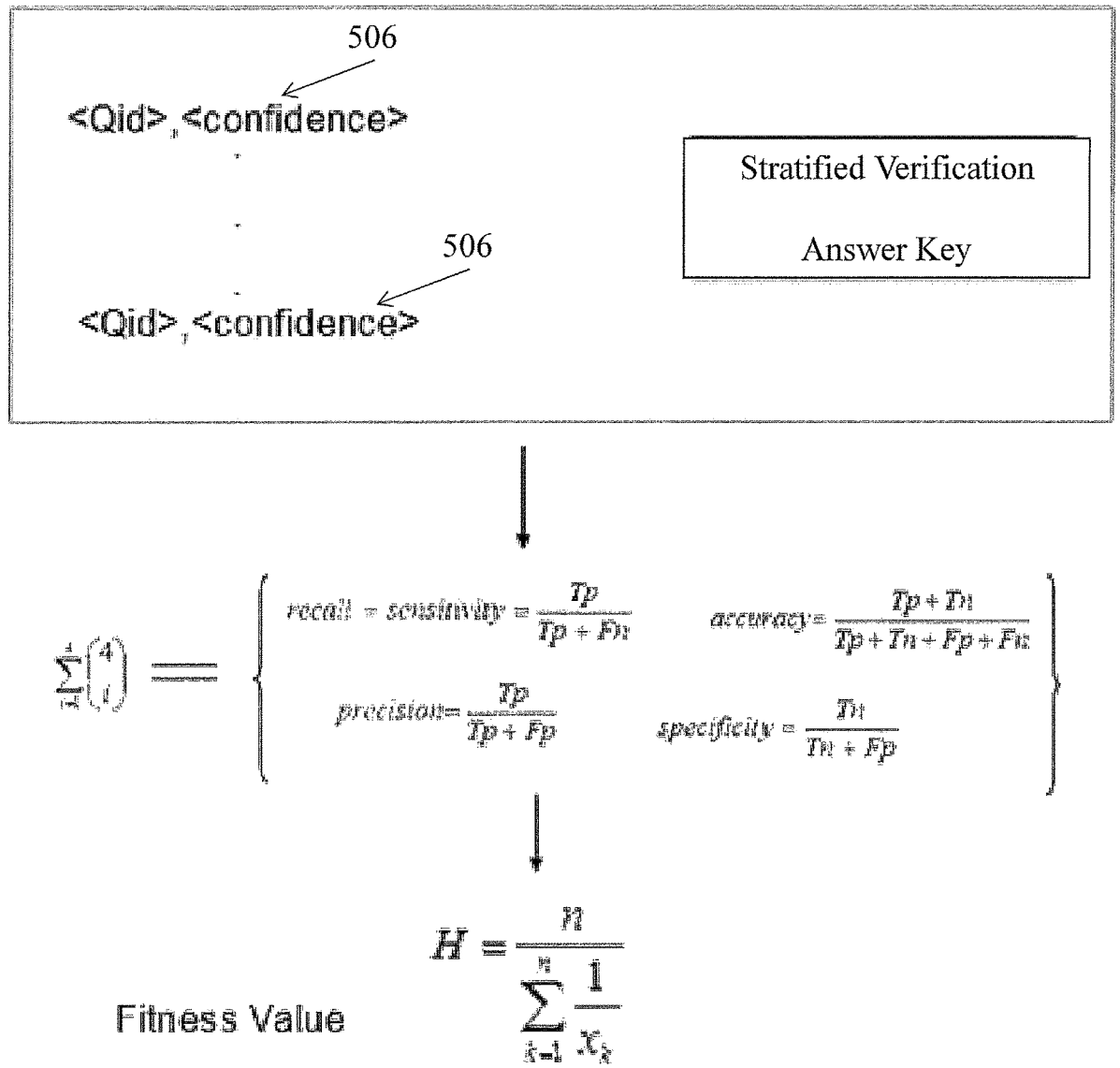
Figure 7:
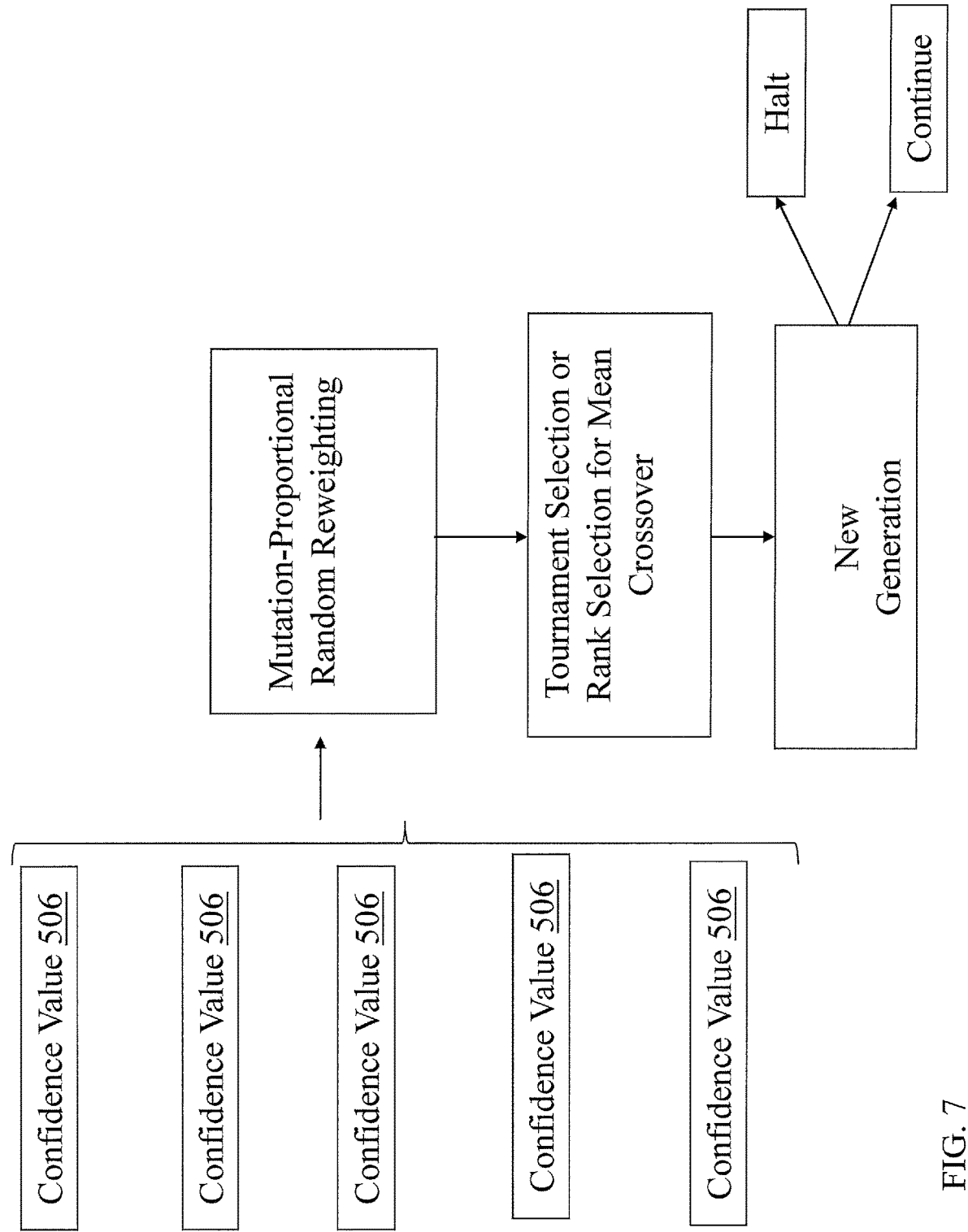

FIGS. 6 and 7 depict example process flows in encoding a maximum likelihood algorithm into the genetic algorithm 113. Each of the candidate questions 102 has an associated label that is marked right or wrong. The seed question and answer pairs 104 including the knowledge base (KB) retrieval expand the existing question into multiple candidate questions 102. The original label remains unchanged and is cloned for each candidate question 102. In such a way, a stratified verification dataset is evaluated by a fitness function to evolve towards the survival of the fittest.

As described herein, the genetic algorithm 113 can act as another level of machine learning (on top of the inner log it level of model 110). It is understood that the genetic algorithm 113 can also take the form of another machine learning algorithm, e.g., a decision tree, naïve Bayesian algorithm and/or a log it algorithm. In any case, the purpose of the genetic algorithm 113 is to learn and tune features of the models 110 using the processes described herein.

Each bank of models M, has i constituent models $m_1$. Each of the $m_1$ models has beta values $\beta_k$, that are attached to a chromosome $c_i$. More particularly, the process involves $M_k$ banks where each bank has i models denoted $m_{ki}$. A function mutates a model picked at random and crosses over models $m'_{mn}$ and $m''_{op}$ where: p=n. The subscripts m and o are indices for k where n and p are indices for i. If a selected halting condition is not met, the genetic algorithm continues to iterate with the goal of converging to the best $P(I_d|M, H_p)$.

Figure 8:
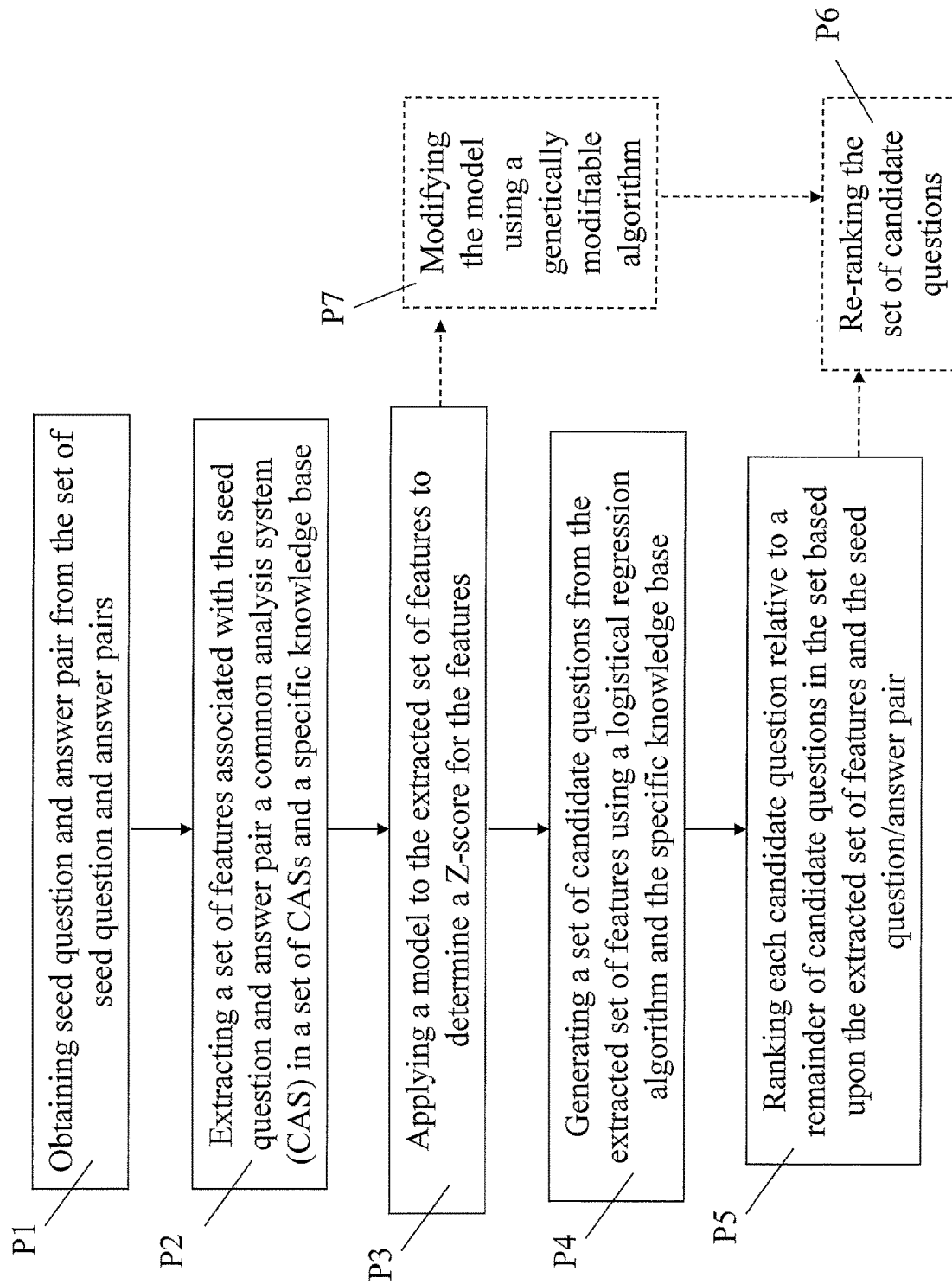
FIG. 8 shows a schematic depiction of a process flow according to various embodiments.
Figure 9:
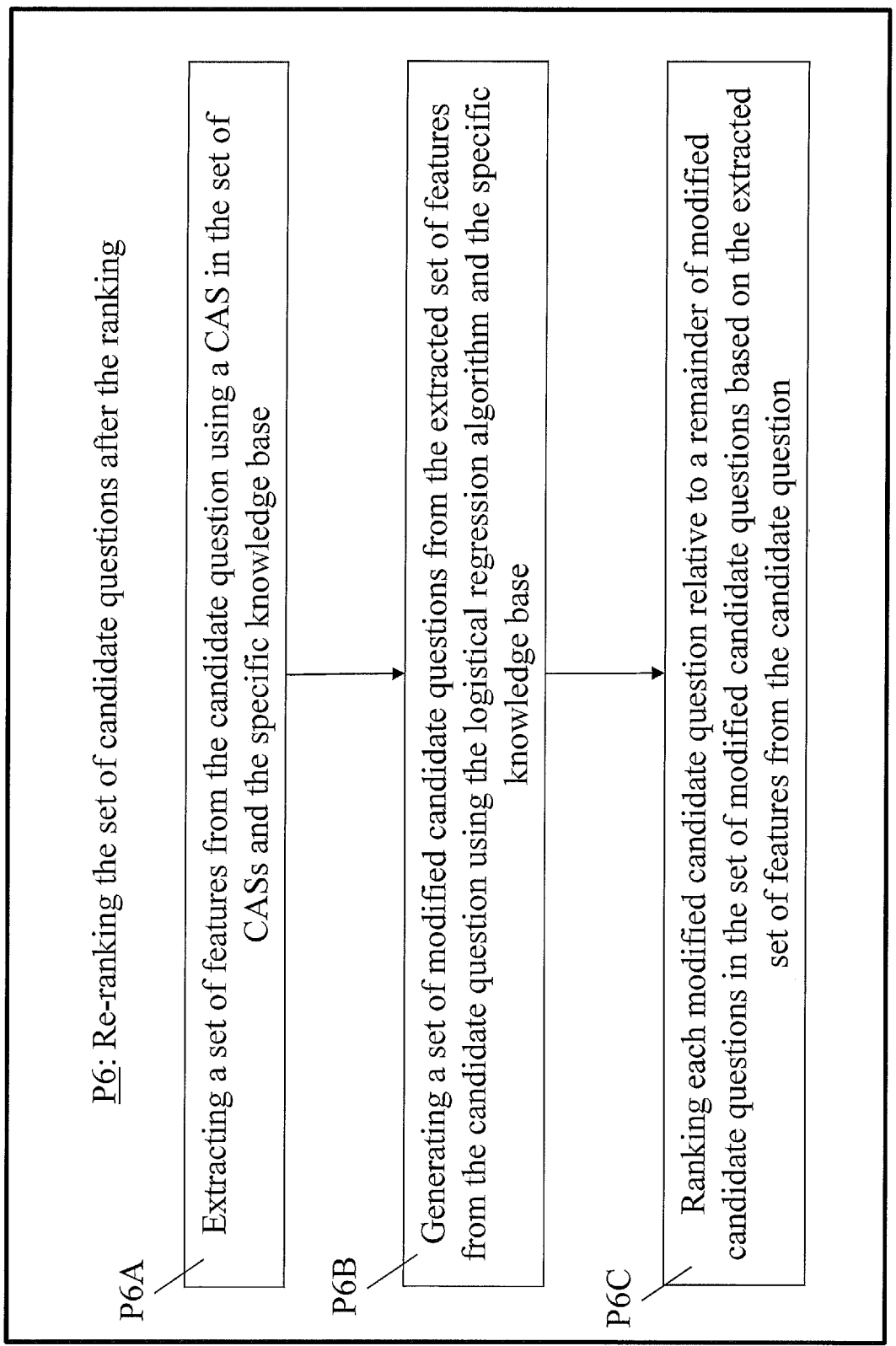
FIG. 9 shows a schematic depiction of a sub-process flow from the process of FIG. 8.

FIG. 8 shows an illustrative process flow depicting a general methodology according to various embodiments. As show, the process flow can include the following processes (P):

P1: obtaining at least one seed question and answer pair from the set of seed question and answer pairs;

P2: extracting a set of features associated with the at least one seed question and answer pair using at least one common analysis system (CAS) in a set of CASs and a specific knowledge base;

P3: applying a model to the extracted set of features to determine a z-score for the features;

P4: generating a set of candidate questions from the extracted set of features using a logistic regression algorithm and the specific knowledge base, wherein each candidate question includes an expansion of each of the extracted set of features;

P5: ranking each candidate question relative to a remainder of candidate questions in the set of candidate questions based on the extracted set of features and the at least one seed question and answer pair;

P6 (Optionally): re-ranking the set of candidate questions after the ranking; and P7 (Optionally): modifying the model(s) using a genetically modifiable algorithm. In some cases, process P7 can be performed prior to process P6, where the algorithm is modified prior to re-ranking.

In some cases, where the re-ranking process of P6 is performed, that process can include sub-processes (P6A-P6C):

P6A: extracting a set of features from the candidate question using at least one CAS in the set of CASs and the specific knowledge base;

P6B: generating a set of modified candidate questions from the extracted set of features from the candidate question using the logistic regression algorithm and the specific knowledge base, wherein each modified candidate question includes an expansion of each of the extracted set of features from the candidate question; and P6C: ranking each modified candidate question relative to a remainder of modified candidate questions in the set of modified candidate questions based on the extracted set of features from the candidate question.

Aspects of the invention disclosed herein provide several advantages over known intelligent question systems. For example, systematic question generation through machine learning algorithms is presented. Newly generated questions are scrutinized/evaluated by iterations in the machine learning framework. Minimum, yet more robust, question seeds serve as initial population or labels for learning a model. The notion of machine learning models is expanded to automatically generate not only answers but questions. Unique combination of NLP techniques (ESG parsing, entity detection, sense disambiguation, aggregation, declarative rule generation) for extracting question features are applied.

Gradually learned questions contribute to closing the gap of knowledge acquisition in the roadmap of question and answering. Both the developers and end-users benefit from automatically generated questions, with developers being able to dissect questions and map their features to the answers, whereas the end-users know in advance what questions may be asked in the future.

While shown and described herein as a method and system for providing an automatic question generator tool, it is understood that aspects of the invention further provide various alternative embodiments. For example, in one embodiment, the invention provides a computer program fixed in at least one computer-readable medium, which when executed, enables a computer system to provide an automatic question generator tool. To this extent, the computer-readable medium includes program code, such as automatic question generator program 30 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as automatic question generator program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating an automatic question generator tool. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to an automatic question generator tool as described herein. In this case, the service provider can manage (e.g., create, maintain, support, etc.) a computer system, such as computer system 20 (FIG. 1), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method for generating at least one candidate question from a set of seed question and answer pairs, the method comprising:
    extracting a set of features associated with at least one seed question and answer pair from the set of seed question and answer pairs using at least one common analysis system (CAS) in a set of CASs and a specific knowledge base;
    generating a set of candidate questions from the extracted set of features using a logistic regression algorithm and the specific knowledge base;
    ranking each candidate question relative to a remainder of candidate questions in the set of candidate questions;
    generating a set of modified candidate questions from a candidate question;
    ranking each modified candidate question relative to a remainder of modified candidate questions in the set of modified candidate questions; and
    re-ranking the set of candidate questions based on the set of modified candidate questions.

2. The computer-implemented method of claim 1, wherein each candidate question includes an expansion of each of the extracted set of features.

3. The computer-implemented method of claim 1, wherein the candidate question includes a factual question.

4. The computer-implemented method of claim 1, further comprising applying at least one model to the extracted set of features to determine a z-score for each feature in the extracted set of features.

5. The computer-implemented method of claim 4, further comprising iteratively modifying the at least one model using a genetic algorithm.

6. The computer-implemented method of claim 4, wherein the ranking of each candidate question relative to the remainder of candidate questions is based upon the z-score for each feature in the extracted set of features.

7. The computer-implemented method of claim 1, wherein generating the set of modified candidate questions from the candidate question and answer pair comprises:
    extracting a set of features from the candidate question using at least one CAS in the set of CASs and the specific knowledge base; and
    modifying the candidate question based on the extracted set of features from the candidate question using the logistic regression algorithm and the specific knowledge base, wherein each modified candidate question includes an expansion of each of the extracted set of features from the candidate question.

8. The computer-implemented method of claim 1, wherein ranking each candidate question relative to the remainder of candidate questions in the set of candidate questions is based on the extracted set of features and the at least one seed question and answer pair.

9. The computer-implemented method of claim 1, wherein ranking each modified candidate question relative to the remainder of modified candidate questions in the set of modified candidate questions is based on the extracted set of features from the candidate question.

10. A computer program product comprising program code stored on a non-transitory computer-readable medium, which when executed on at least one computing device, causes the at least one computing device to generate at least one candidate question from a set of seed question and answer pairs by performing actions including:
- extracting a set of features associated with at least one seed question and answer pair from the set of seed question and answer pairs using at least one common analysis system (CAS) in a set of CASs and a specific knowledge base;
- generating a set of candidate questions from the extracted set of features using a logistic regression algorithm and the specific knowledge base;
- ranking each candidate question relative to a remainder of candidate questions in the set of candidate questions;
- generating a set of modified candidate questions from a candidate question and answer pair;
- ranking each modified candidate question relative to a remainder of modified candidate questions in the set of modified candidate questions; and
- re-ranking the set of candidate questions based on the set of modified candidate questions.

11. The computer program product of claim 10, wherein each candidate question includes an expansion of each of the extracted set of features.

12. The computer program product of claim 10, wherein the specific knowledge base is selected from a group of knowledge bases.

13. The computer program product of claim 10, wherein, when the program code is executed on the at least one computing device, the program code causes the at least one computing device to further perform applying at least one model to the extracted set of features to determine a z-score for each feature in the extracted set of features.

14. The computer program product of claim 13, wherein, when the program code is executed on the at least one computing device, the program code causes the at least one computing device to further perform iteratively modifying the at least one model using a genetic algorithm.

15. The computer program product of claim 13, wherein the ranking of each candidate question relative to the remainder of candidate questions is based upon the z-score for each feature in the extracted set of features.

16. The computer program product of claim 10, wherein generating the set of modified candidate questions from the candidate question and answer pair comprises:
- extracting a set of features from the candidate question using at least one CAS in the set of CASs and the specific knowledge base; and
- modifying the candidate question based on the extracted set of features from the candidate question using the logistic regression algorithm and the specific knowledge base, wherein each modified candidate question includes an expansion of each of the extracted set of features from the candidate question.

17. A system comprising:
at least one computing device configured to generate at least one candidate question from a set of seed question and answer pairs by performing actions including:
- extracting a set of features associated with at least one seed question and answer pair from the set of seed question and answer pairs using at least one common analysis system (CAS) in a set of CASs and a specific knowledge base;
- generating a set of candidate questions from the extracted set of features using a logistic regression algorithm and the specific knowledge base;
- ranking each candidate question relative to a remainder of candidate questions in the set of candidate questions;
- generating a set of modified candidate questions from a candidate question and answer pair;
- ranking each modified candidate question relative to a remainder of modified candidate questions in the set of modified candidate questions; and
- re-ranking the set of candidate questions based on the set of modified candidate questions.

18. The system of claim 17, wherein each candidate question includes an expansion of each of the extracted set of features.

19. The system of claim 17, wherein the specific knowledge base is selected from a group of knowledge bases.

20. The system of claim 17, wherein generating the set of modified candidate questions form the candidate question and answer pair comprises:
- extracting a set of features from the candidate question using at least one CAS in the set of CASs and the specific knowledge base; and
- modifying the candidate question based on the extracted set of features from the candidate question using the logistic regression algorithm and the specific knowledge base, wherein each modified candidate question includes an expansion of each of the extracted set of features from the candidate question.

\* \* \* \* \*